United States Patent [19]

Dines

[11] 4,324,767

[45] Apr. 13, 1982

[54] SEPARATION PROCESS UTILIZING MICROCAPSULES

[75] Inventor: Martin B. Dines, Santa Ana, Calif.

[73] Assignee: Occidental Research Corporation, Irvine, Calif.

[21] Appl. No.: 175,161

[22] Filed: Aug. 4, 1980

[51] Int. Cl.³ .............................................. C01G 43/00
[52] U.S. Cl. ...................................... 423/3; 210/638; 423/10
[58] Field of Search ................ 204/157.1 R; 210/638, 210/644, 648, 649, 651, 663, 682, 757, 766, 912; 423/3, 8, 10; 252/316

[56] References Cited

U.S. PATENT DOCUMENTS

| | | | |
|---|---|---|---|
| 2,800,457 | 7/1957 | Green et al. | 252/316 |
| 2,800,458 | 7/1957 | Green | 252/316 |
| 3,711,591 | 1/1973 | Hurst et al. | 423/10 |
| 3,737,513 | 6/1973 | Wiewiorowski et al. | 423/8 |
| 3,779,907 | 12/1973 | Li et al. | 210/638 |
| 4,131,527 | 12/1978 | Friedman et al. | 204/157.1 R |

*Primary Examiner*—Ivars C. Cintins
*Attorney, Agent, or Firm*—Christie, Parker & Hale

[57] ABSTRACT

The instant invention relates to a process for removing a species from a fluid which comprises (a) contacting said fluid with a hollow microcapsule, said microcapsule having a wall surrounding an internal void, said wall being substantially insoluble in said fluid and said species being permeable to said wall; (b) permeating said species through said wall into said void; (c) converting said permeated species, in said void into a species which is impermeable to said wall; (d) separating said microcapsule from said fluid; (e) converting the impermeable species of step (c) into a species which is permeable to said wall; and (f) permeating the permeable species of step (e) through said wall. Preferably said void contains a reagent which together with said permeated species form a reversible oxidation-reduction couple. In the instant preferred embodiment said permeated species is converted into an impermeable species by means of said oxidation-reduction reaction to trap said impermeable species in said void. The spent microcapsules, i.e. microcapsules are no longer capable of converting the permeable species of step (c) into an impermeable species, are regenerated by reconverting the impermeable species into a permeable species by reversing such oxidation-reduction reaction by means of heat, light, or the absence of light. The instant process is particularly preferred for separating multivalent metal ions from aqueous solutions.

29 Claims, No Drawings

SEPARATION PROCESS UTILIZING MICROCAPSULES

BACKGROUND OF THE INVENTION

1. Field of the Invention

The instant invention relates to a process for removing a species from a fluid which comprises (a) contacting said fluid with a hollow microcapsule, said microcapsule having a wall surrounding an internal void, said wall being substantially insoluble in said fluid and said species being permeable to said wall; (b) permeating said species through said wall into said void; (c) converting said permeated species, in said void into a species which is impermeable to said wall; (d) separating said microcapsule from said fluid; (e) converting the impermeable species of step (c) into a species which is permeable to said wall; and (f) permeating the permeable species of step (e) through said wall. Preferably said void contains a reagent which together with said permeated species form a reversible oxidation-reduction couple. In the instant preferred embodiment said permeated species is converted into an impermeable species by means of said oxidation-reduction reaction to trap said impermeable species in said void. The spent microcapsules, i.e. microcapsules are no longer capable of converting the permeable species of step (c) into an impermeable species, are regenerated by reconverting the impermeable species into a permeable species by reversing such oxidation-reduction reaction by means of heat, light, or the absence of light. The instant process is particularly preferred for separating multivalent metal ions from aqueous solutions.

2. Description of the Prior Art

Encapsulation or micro-encapsulation is generally considered as a special form of packaging wherein individual particles which can be liquid, gaseous, or solid in nature are individually coated for protection against the environment. Such microcapsules are utilized in adhesives, agricultural chemicals, food products, graphic arts, household cleansers and detergents, paints and sealants, pharmaceuticals, fuels, rubber chemicals, paper and paper products, cosmetics, and magnetics. In none of the above industries are microcapsules utilized as a separation means and it is apparent why this is so. Microcapsules, in general, are utilized on a one-time basis, that is, when material which is encapsulated is to be released, the capsules are either broken for an abrupt release or the material contained in the capsules is slowly released into the environment by permeation through the capsule wall. Heretofore, no one, has commercially utilized microcapsules as a separation medium. Moreover, no one has regenerated active microcapsules, after use as a separation medium, by permeating the separated material out of the capsule and recovering the microcapsules for reuse.

SUMMARY OF THE INVENTION

The instant invention relates to a process for removing a species from a fluid which comprises (a) contacting said fluid with a hollow microcapsule, said microcapsule having a wall surrounding an internal void, said wall being substantially insoluble in said fluid and said species being permeable to said wall; (b) permeating said species through said wall into said void; (c) converting said permeated species, in said void, into a species which is impermeable to said wall; (d) separating said microcapsule from said fluid; (e) converting the impermeable species of step (c) into a species which is permeable to said wall and (f) permeating the permeable species of step (e) through said wall. In the instant process, the species will permeate into the internal void of the microcapsule until its concentration in said internal void is equal to concentration of species in the fluid. To drive this permeation further, whereby a greater concentration of said species is obtained in said internal void, a reagent will be included in such internal void which is capable of converting said species into an impermeable species. In this manner the species which permeates into the volume is trapped therein. One preferred method for converting said species into an impermeable species is by means of an oxidation-reduction reaction, preferably a reversible oxidation-reduction. Thus, the reagent will, together with said permeated species, form a reversible oxidation-reduction couple.

The successful operation of the process hinges on the ability to trap a species within the capsules and release said species again. This is accomplished by reversibly rendering the species impermeable once inside. The species can be rendered impermeable by various methods, e.g. by precipitating the species within the capsules, or by including in the encapsulating material (i.e. the wall of the microcapsule) an agent or function which is selective for one oxidation state of the species over another. This agent or function which selectively complexes (and allows for transport) can either be "dissolved" in the encapsulating material (such as a plasticizer in a polymer) or it may be bound, e.g. grafted to a polymeric encapsulating material.

This process is especially suitable for removing multivalent ions preferably multivalent metal ions, from solution. In this aspect of the instant process, the wall of the hollow microcapsule is prepared from a material which is permeable to said multivalent ion in a first valence state and impermeable to said multivalent ion in a second valence state. Thus, the multivalent ion will permeate through the wall of the hollow microcapsule into the internal void wherein it is contacted with such reagent and converted by means of an oxidation-reduction reaction into an impermeable valence state. The reagent forming an oxidation-reduction couple with said multivalent ion is simultaneously converted into a different valence state. In the preferred embodiment of this invention, such conversion is sensitive to an electromagnetic field, such as provided by light or heat. Thus, in one embodiment the permeation will be effected at a temperature which favors converting the multivalent ion to an impermeable state in the internal void of the microcapsule. After sufficient permeation is effected, the microcapsules are separated from the solution and subjected to a different temperature which converts the multivalent ion from the impermeable valence state to a permeable valence state. Therefore, the hollow microcapsules can be contacted with a solvent for the multivalent ion whereby the microcapsules are regenerated by permeation of the multivalent ion, in its permeable valence state, from the internal void of the microcapsule back into the solvent.

In other preferred embodiment mentioned above, the permeation will take place either in the presence or absence of light whereby the permeating species is converted to an impermeable state and trapped in the void of the microcapsule. After sufficient permeation is effected, the microcapsules will be separated from the solution and subjected either to light or the absence of light, depending on which favors converting said multivalent ions back to their permeable state and thus regenerating the hollow microcapsules in a manner similar to that disclosed above for temperature sensitive multivalent ions.

Species which can be removed by the process of the instant invention are limitless. Any species which can permeate the wall of a hollow microcapsule and subsequent to such permeation be converted into a reversible impermeable state may be subject to the instant invention. The preferred process, as noted above, requires a specie which can be converted into an impermeable state by a reversible oxidation-reduction reaction. Suitable species include multivalent metal ions, which together with a reagent contained in the internal void of the capsule, form reversible oxidation-reduction reaction. Suitable species include multivalent metal ions, which together with a reagent contained in the internal void of the capsule, form reversible oxidation-reduction reaction couples. Examples of such multivalent metal ions, and functions or agents which complexes with only one valence state of said multivalent ion and corresponding reagents which together with said multivalent metal ions form a reversible oxidation-reduction couple may be selected generally from the group consisting of $I^-/I_2$, quinone/hydroquinone, $Fe^{+2}/Fe^{+3}$, etc. are given below in the Table.

| ION | COMPLEXING AGENT | |
|---|---|---|
| $Fe^{+3}$ | Acetylacetone | (Selective Over $Fe^{+2}$) |
| $Mn^{+3}$ | Acetylacetone | (Selective Over $Mn^{+2}$) |
| $Cr^{+2}$ | Acetylacetone | (Selective Over $Cr^{+3}$) |
| $Ce^{+4}$ | 8-hydroxyquinoline | (Selective Over $Ce^{+3}$) |
| $U^{+4}$ | Cupferron | (Selective Over $U^{+6}$) |
| $V^{+5}$ | N-Benzoyl-n-phenyl hydroxyamine | (Selective Over $V^{+4}$) |
| $Sn^{+2}$ | Dithizone | (Selective Over $Sn^{+4}$) |
| $Cr^{+6}$ | Diethyldithiocarbamate | (Selective Over $Cr^{+3}$) |
| $Co^{+2}$ | Diethyldithiocarbamate | (Selective Over $Co^{+3}$) |
| $Pu^{+4}$ | Tri-n-butylphosphate | (Selective Over $Pu^{+6}$) |
| $Pu^{+4}$ | Tri-n-octylphosphine oxide | (Selective Over $Pu^{+6}$ and $Pu^{+3}$) |
| $Cr^{+6}$ | High molecular weight amines | (Selective Over $Cr^{+3}$) |

(a) These complexing agents may be utilized as plasticizers in polymer which forms the microcapsule wall or alternatively they can by addition of a suitable polymerizable group be copolymerized into said polymer.

The microcapsules may be formed by methods known in the art. See for example U.S. Pat. Nos. 2,800,457 and 2,800,458 herein incorporated by reference to disclose methods for forming suitable microcapsules. These patents teach microencapsulation by means of a coacervation, wherein a liquid polymeric material is deposited around the material, in this case the reagent to be coated and subsequently gelled. Other methods for forming microcapsules, such as disclosed in French Pat. No. 2,648,609 and U.S. Pat. Nos. 3,159,874; 3,015,128; 2,648,609, and 2,799,241 may be utilized. As will be appreciated, the method for forming microcapsules does not form part of this invention.

The material which is used to encapsulate the reagent will contribute to the success of the instant invention. For example, polymeric materials which are permeable to the species which is to be separated are selected. Suitable polymeric materials include gelatin, gum arabic, polyolefins, polystyrene, and polyelectrolytes, etc. The wall of said hollow microcapsules may conveniently be made from a material which provides as much strength as desired since the capsules do not function by rupture of such wall. As noted above, the capsules will be regenerated by converting the permeated species back into a permeable species.

If light or the absence of light is to be used to effect said reversible conversion, then the material selected will, of course, be transparent to said light.

The above described microcapsules, including a suitable reagent for converting permeable species into nonpermeable species in the internal void thereof may be contacted with an aqueous solution containing a species which is to be removed therefrom under conditions of mild agitation. For example the microcapsules may be contacted with the aqueous solution on a batch basis wherein the microcapsules and the aqueous solution are mixed together under conditions designed to disperse the microcapsules in the aqueous solution. Alternatively, the microcapsules may be contacted with the aqueous solution in a column designed for counter-current extraction as is known in the art of liquid extraction processes. The contacting will take place under agitation and temperature conditions which are insufficient to break the microcapsules, although as noted above since the microcapsules do not function by rupture the material utilized in forming the capsules may be selected to withstand any reasonable agitation force. In general, temperatures above the freezing point and below the boiling point of the aqueous solution may be used in the instant process. Higher temperatures, of course, will increase the rate of transfer through the microcapsule wall as in any membrane process. However, the integrity of such wall may be adversely affected. In a limited number of experiments, one skilled in the art can determine the most suitable temperature for any given separation process. Temperatures of from 15° C. to 80° C. may be used in general with temperatures of from 25° C. to 50° C. most preferred.

The instant process may utilize gaseous reagents i.e. wherein the reagent is gaseous in the internal void or the microcapsules may be contacted with a gaseous sodium during the removal of the above species or the regeneration of the microcapsules used to separate such species. In this case the components of the microcapsulated reagent (except for the wall) or the species to be separated may obviously be above their boiling point.

Similarly the pressure will be maintained so that the microcapsules do not rupture. For economic reasons ambient pressures are generally used.

The time for contacting the microcapsules with the aqueous solution will be selected in accordance with the nature of the particular microcapsule, including the surface area and thickness of the microcapsule walls, and the aqueous solution which is being contacted. Contact times of from 1 minute to 1 hour may be conveniently used in the instant process.

The microcapsules being immiscible with the aqueous solution is easily separated therefrom. In the batch process, the microcapsules may be separated merely by terminating the agitation. Depending on the relative specific gravity of the spent microcapsules and the aqueous solution, the microcapsules will separate at the bottom or the top of the batch reactor. The microcapsules may then be conveniently removed by decanting.

The separated and spent microcapsules will be treated to convert the impermeable species contained in the internal void into a permeable state. Such conversion will be carried out by means of an oxidation-reduction reaction which may be initiated by heat, light, etc. As noted above the regeneration of the microcapsules, by conversion of the impermeable specie into a permeable specie, is carried out at conditions whereby the microcapsules are not ruptured. The above regeneration may be carried out at temperatures of from 1° to 99° C. while temperatures of from 25° to 75° C. are preferred for the aforesaid regeneration. In general, the separated and spent microcapsules will be agitated with a fresh aqueous solution which can receive the permeable species from the aqueous solution described above. However, in the regeneration step, the permeation of the species will be from the internal void of the microcapsules into the fresh aqueous solution, and the regenerated reagent will be contained therein.

After a sufficient amount of permeable component has passed into the fresh aqueous solution, the agitation may be terminated and microcapsules which may be suitable for reuse in the above process may be recovered. The permeable species may be recovered as a solution in said fresh aqueous solution.

While the above process was described in terms of contacting a water insoluble microcapsule with an aqueous solution, it will be appreciated by one skilled in the art that oil insoluble microcapsules can be used to remove permeable species from oil solutions. Furthermore, the fluid to be contacted with the microcapsules may be a gas.

The above invention may be illustrated in terms of the specific examples given.

Example I

Extraction of $U^{+6}$ from an Acid Stream

An encapsulated aqueous phase containing hydroquinone in an aqueous acid phase is prepared by methods familiar to those skilled in the art. The encapsulating material may, for example be polystyrene and the acid may be phosphoric or sulfuric. Emulsion polymerization of styrene monomer is used for form microcapsules having polystyrene walls and the aqueous hydroquinone phase trapped within the microcapsule void. The microcapsules are treated with an organic complexing extractant selective for uranium $+6$ over uranium $+4$, such as DEHPA-TOPO (diethyl hexylphosphoric acid trioctylphosphine oxide) which migrates into the walls as a plasticizer. The amount of DEHPA-TOPO may vary from 0.01 to 10 pph polystyrene. Higher amounts are preferred but an upper limit will be determined by the softening action of the DEHPA-TOPO plasticizer on the microcapsule walls. When the plasterized microcapsules are contacted with a stream containing 0.1% by weight, hexavalent uranium, in the presence of light, having a wavelength of about 4200 Å, the uranium is photoreduced inside the capsules according to the reaction.

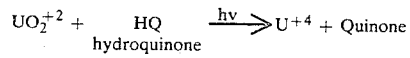

Note that, since the hydroquinone is impermeable to the capsule walls the reaction only can take place in the internal void of the microcapsule. Typically, a solution from 0.5% to 5% hydroquinone, by weight, encapsulated in the microcapsules is used.

Once formed, the $U^{+4}$ will not permeate back out of the capsule since it is not preferably complexed by DEPHA-TOPO. Only when the illumination is ceased and the above reaction reversed will the uranium be permeable again (as $U^{+6}$). By the above process the uranium is concentrated within the capsules—that is, its concentration after a certain time period of contacting is greater than that in the stream contacted.

EXAMPLE II

Extraction of $U^{+4}$ from a Stream

In this case, tetravalent uranium ($U^{+4}$) is extracted from a stream by an encapsulated aqueous solution containing an oxidant such as quinone. The transport of the $U^{+4}$ through the polymer into the oxidant containing internal void is facilitated by a complexing agent-OPPA (octylphenyl phosphoric acid)—which is selective for $U^{+4}$ over $U^{+6}$ (e.g. as $UO_2^{+2}$) and may be used to plasticize the walls of a polystyrene microcapsule in the manner described in example 1. The $U^{+4}$, once permeated into the capsule void, is spontaneously, oxidized to $U^{+6}$ (as $UO_2^{+2}$) while the quinone is reduced to hydroquinone. After the $UO_2^{+2}$ level within the capsule is built up to a sufficient value dictated by conditions such as time and concentration of the oxidant, the capsules are easily separated from the feed stream. The separated capsules are contacted with a solvent for $U^{+4}$ while irradiating such capsules with light having a wavelength of 4200 Å, thus converting the $UO_2^{+2}$ into the permeable $U^{+4}$ state. After a time the tetravalent uranium permeates through the walls of the microcapsule into said solvent whereby microcapsules are regenerated.

I claim:

1. A process for removing a species from a fluid which comprises:
    (a) contacting said fluid with a hollow microcapsule, said microcapsule having a wall surrounding an internal void, said wall being substantially insoluble in said fluid and said species being permeable to said wall;
    (b) permeating said species through said wall into said void;
    (c) converting said permeated species, in said void, into a species which is impermeable to said wall;
    (d) separating said microcapsule from said fluid;
    (e) converting the impermeable species of step (c) into a species which is permeable to said wall; and
    (f) permeating the permeable species of step (e) through said wall.

2. The process of claim 1 wherein said void contains a reagent which is capable of converting said permeated species into an impermeable species.

3. The process of claim 2 wherein said reagent and said permeated species form a reversible oxidation-reduction couple.

4. The process of claim 3 wherein said permeated species is converted into an impermeable species by means of an oxidation-reduction reaction.

5. The process of claim 4 wherein said impermeable species is converted into a permeable species by reversing such oxidation-reduction reaction.

6. The process of claim 5 wherein said oxidation-reduction reaction is reversed by heating said oxidation-reduction couple.

7. The process of claim 5 wherein said oxidation-reduction reaction is reversed by irradiating said oxidation-reduction couple with light.

8. The process of claim 2 wherein said separated microcapsule of step (d) is contacted with a solvent for said permeable species during the conversion step (e).

9. The process of claim 1 wherein said wall comprises a polymeric material.

10. The process of claim 1 wherein said fluid is an aqueous solution and said species is dissolved therein.

11. A process for removing a multivalent species from a solution which comprises:
 (a) contacting said solution with a microcapsule having a wall which is permeable to said species when said species is in a first valence state and impermeable to said species when said species is in a second valence state, said wall surrounding a reagent which is capable of reversibly converting said species from said first valence state to said second valence state;
 (b) permeating said species, in said first valence state, through said wall;
 (c) converting said permeated species by means of such reagent into said second valence state;
 (d) separating said microcapsule from said solution;
 (e) converting said species from said second valence state to said first valence state; and
 (f) permeating said species of step (e) through said wall.

12. The process of claim 11 wherein said multivalent species is a metal ion.

13. The process of claim 12 wherein said wall comprises a polymeric material.

14. The process of claim 13 wherein said conversion of step (c) is carried out in the absence of light and said conversion of step (e) is effected by means of light.

15. The process of claim 13 wherein the conversion of step (c) is carried out in the presence of light and said conversion of step (e) is effected by the absence of light.

16. The process of claim 13 wherein the conversion of step (e) is effected by cooling the impermeable species to a temperature below the temperature at which the conversion of step (c) occurs.

17. The process of claim 13 wherein said metal ion is uranium.

18. The process of claim 17 wherein the said first valence state is $+4$ and the second valence state is $+6$.

19. The process of claim 18 wherein said reagent is selected from the group consisting of $Fe^{+3}$, $I_2$, and quinone.

20. The process of claim 17 wherein said first valence state is $+6$ and the second valence state is $+4$.

21. The process of claim 17 wherein said reagent is selected from the group consisting of $Fe^{+2}$, $I^-$, and hydroquinone.

22. The process of claim 12 wherein the conversion of step (e) is effected by heating the impermeable species to a temperature above the temperature at which the conversion of step (c) occurs.

23. A process for removing metal ions having multiple valence states from a solution containing said metal ions in a first valence state which comprises:
 (a) contacting said solution with a microcapsule having a wall comprising a polymeric material which is permeable to said metal ions when said metal ions are in the first valence state and impermeable to said metal ions when said metal ions are in a second valence state, and said wall surrounding a reagent which is capable of reversibly converting said metal ions from said first valence state to said second valence state;
 (b) permeating said metal ions in said first valence state through said wall;
 (c) converting said permeated metal ions by means of said surrounded reagent into said second valence state;
 (d) separating said microcapsule from said solution;
 (e) converting said metal ions from said second valence state to said first valence state; and
 (f) permeating said metal ions in said first valence state through said wall.

24. The process of claim 23 wherein said conversion of step (c) is carried out in the absence of light and said conversion of step (e) is effected by means of light.

25. The process of claim 23 wherein the conversion of step (c) is carried out in the presence of light and said conversion of step (e) is effected by the absence of light.

26. The process of claim 23 wherein the conversion of step (e) is effected by heating the impermeable metal ions to a temperature above the temperature at which the conversion of step (c) occurs.

27. The process of claim 23 wherein the conversion of step (e) is effected by cooling the impermeable metal ions to a temperature below the temperature at which the conversion of step (c) occurs.

28. A process for removing ionic uranium in the $+4$ valence state from an aqueous solution which comprises:
 (a) contacting said aqueous solution with a microcapsule having a polymeric wall surrounding an aqueous solution containing a reagent selected from the group consisting of $Fe^{+3}$, $I_2$ and quinone, said wall being substantially insoluble in said fluid and said ionic uranium in the $+4$ valence state being permeable to said wall;
 (b) permeating ionic uranium in the $+4$ valence state through said wall into said aqueous solution;
 (c) converting said ionic uranium in the $+4$ valence state in said aqueous solution to ionic uranium in the $+6$ valence state and which is impermeable to said wall;
 (d) separating said microcapsules from said aqueous solution;
 (e) converting the ionic uranium in the $+6$ valence state into permeable ionic uranium in the $+4$ valence state; and
 (f) permeating the ionic uranium in the $+4$ valence state through said wall.

29. A process for removing ionic uranium in the $+6$ valence state from an aqueous solution which comprises:
 (a) contacting said aqueous solution with a microcapsule having a polymeric wall surrounding an aqueous solution containing a reagent selected from the group consisting of $Fe^{+2}$, $I^-$ and hydroquinone, said wall being substantially insoluble in said fluid and said ionic uranium in the $+6$ valence state being permeable to said wall;
 (b) permeating ionic uranium in the $+6$ valence state through said wall into said aqueous solution;
 (c) converting said ionic uranium in the $+6$ valence state in said aqueous solution to ionic uranium in the $+4$ valence state and which is impermeable to said wall;
 (d) separating said microcapsules from said aqueous solution;
 (e) converting the ionic uranium in the $+4$ valence state into permeable ionic uranium in the $+6$ valence state; and
 (f) permeating the ionic uranium in the $+6$ valence state through said wall.

* * * * *